(12) United States Patent
Tai

(10) Patent No.: US 6,178,619 B1
(45) Date of Patent: Jan. 30, 2001

(54) ASSEMBLING METHOD FOR KEY BOARD

(76) Inventor: Fu-Chen Tai, No. 101-1, Chung Shang Rd., Sec., 2, Ta Chung Hsiang, Chiang Hwa Hsien (TW)

(*) Notice: Under 35 U.S.C. 154(b), the term of this patent shall be extended for 0 days.

(21) Appl. No.: 09/273,349

(22) Filed: Mar. 22, 1999

(51) Int. Cl.[7] .................................................. H01H 11/00
(52) U.S. Cl. ....................... 29/622; 364/709.08; 364/708; 364/709.11
(58) Field of Search ................................. 29/622, 610.1; 364/709.11, 709.08, 709.01, 708; 341/20, 21, 22; 400/472

(56) References Cited

U.S. PATENT DOCUMENTS

| | | | | |
|---|---|---|---|---|
| 5,220,521 | * | 6/1993 | Kikinis | 364/709.08 |
| 5,459,461 | * | 10/1995 | Crowley et al. | 341/22 |
| 5,742,241 | * | 4/1998 | Crowley et al. | 341/22 |
| 5,969,644 | * | 10/1999 | Koutaka | 341/22 |
| 6,028,591 | * | 2/2000 | Lueders | 345/156 |

* cited by examiner

Primary Examiner—Lee Young
Assistant Examiner—Sean Smith
(74) Attorney, Agent, or Firm—Rosenberg, Klein & Lee

(57) ABSTRACT

The present invention provides a keyboard assembling method wherein all components of the keyboard are flexible materials. First, a flexible circuit membrane with circuit and a plurality of contacts are arranged on a flexible substrate. Secondly, a flexible plate is arranged on the flexible circuit membrane, a plurality of resilient bodies integrally formed with the flexible plate are arranged and corresponding to the contacts on the flexible circuit membrane. Thirdly, a flexible cover having a plurality of integrally-formed and concave keytops is arranged on the flexible plate such that each resilient body can be placed within corresponding keytop. Finally, the peripheral of all components are tightly joined, thus completes the keyboard assembling task. The keytops are integrally formed with the flexible cover and those components are joined by radio heating, thus saves assembling time and labor. Moreover, the design of the inventive is more ergonomic. The inventive keyboard can be rolled to for being easily portable and has waterproof effect.

4 Claims, 5 Drawing Sheets

Placing flexible circuit membrane on a flexible substrate.

Arranging a flexible plate on the flexible circuit membrane, a plurality of resilient bodies integrally formed with the flexible plate are arranged corresponding to the contacts on the flexible circuit membrane.

Arranging a flexible cover having a pluality of integrally-formed and projecting keytops on the flexible plate such that each resilient body can be placed within corresponding keytop.

Joinging the peripheral of all components by radio heating, thus completes the keyboard assembling task.

FIG.2

PIROR ART

ASSEMBLING METHOD FOR KEY BOARD

FIELD OF THE INVENTION

The present invention relates to an assembling method for keyboard, more particularly, to an assembling method, which can be more easily assembled to reduce manufacture time and cost, the constitutional component thereof are of flexible material to provide rolling function.

BACKGROUND OF THE INVENTION

As shown in FIG. 4, the conventional keyboard 10 comprises a rigid base 1a, a circuit board 2a on the base 1a and with one end thereof being electrically connected to a conductive wire, a plate 3a over the circuit board 2a, a plurality of resilient bodies 31a integrally formed on the plate 3a and corresponding to the contacts 21a on the circuit board 2a, a rigid cover 4a corresponding to the resilient body 31a and having a plurality of openings 41a. The keytop 5a is placed within the opening 41a and the resilient body 31a is placed within the keytop 5a. When the user press the keytop 5a, the resilient body 31a is deformed to touch the contact 21a on the circuit board 2a. The contact 21a is conducted such that the electric signal is transmitted to the computer through the conductive wire.

However, the conventional keyboard 10a is generally assembly by locking, in other word, by assembling the base 1a with the rigid cover 4a, the assembling task is complicated. The assembling of the keytop 5a is especially troublesome. Therefore, the assembling of the keyboard 10a is both labor and time consuming. Moreover, the conventional keyboard 10a has aperture on top of the cover 4a for placement of the keytop 5a. The circuit within the keyboard 10a has short-circuit problem when water is leaked from the aperture. Furthermore, the base 1a, cover 4a, and keytop 5a of the keyboard 10a are all made of rigid material, this makes the keyboard 10a impossible to roll. Therefore, the keyboard 10a is hard to portable due to its specific volume. It is an object of the present invention to a keyboard assembling method wherein all components of the keyboard are flexible materials. First, a flexible circuit membrane with circuit and a plurality of contacts are arranged on a flexible substrate. Secondly, a flexible plate is arranged on the flexible circuit membrane, a plurality of resilient bodies integrally formed with the flexible plate are arranged and corresponding to the contacts on the flexible circuit membrane. Thirdly, a flexible cover having a plurality of integrally-formed and concave keytops is arranged on the flexible plate such that each resilient body can be placed within corresponding keytop. Finally, the peripheral of all components are tightly joined, thus completes the keyboard assembling task. The keytops are integrally formed with the flexible cover and those components are joined by radio heating, thus saves assembling time and labor. Moreover, the design of the inventive is more ergonomic.

It is another object of the present invention to provide a keyboard assembling method wherein the peripherals of all components thereof are joined by radio heating such that no aperture is formed between the base and the cover. The keyboard has closed appearance and is waterproof It is still another object of the present invention to provide a keyboard assembling method wherein all components thereof are flexible such that the keyboard can be conveniently rolled. The various objects and advantages of the present invention will be more readily understood from the following detailed description when read in conjunction with the appended drawing, in which:

BRIEF DESCRIPTION OF DRAWING

FIG. 2 is the flow chart for assembling the inventive keyboard;

DETAIL DESCRIPTION OF PREFERRED EMBODIMENT

Figure 1:
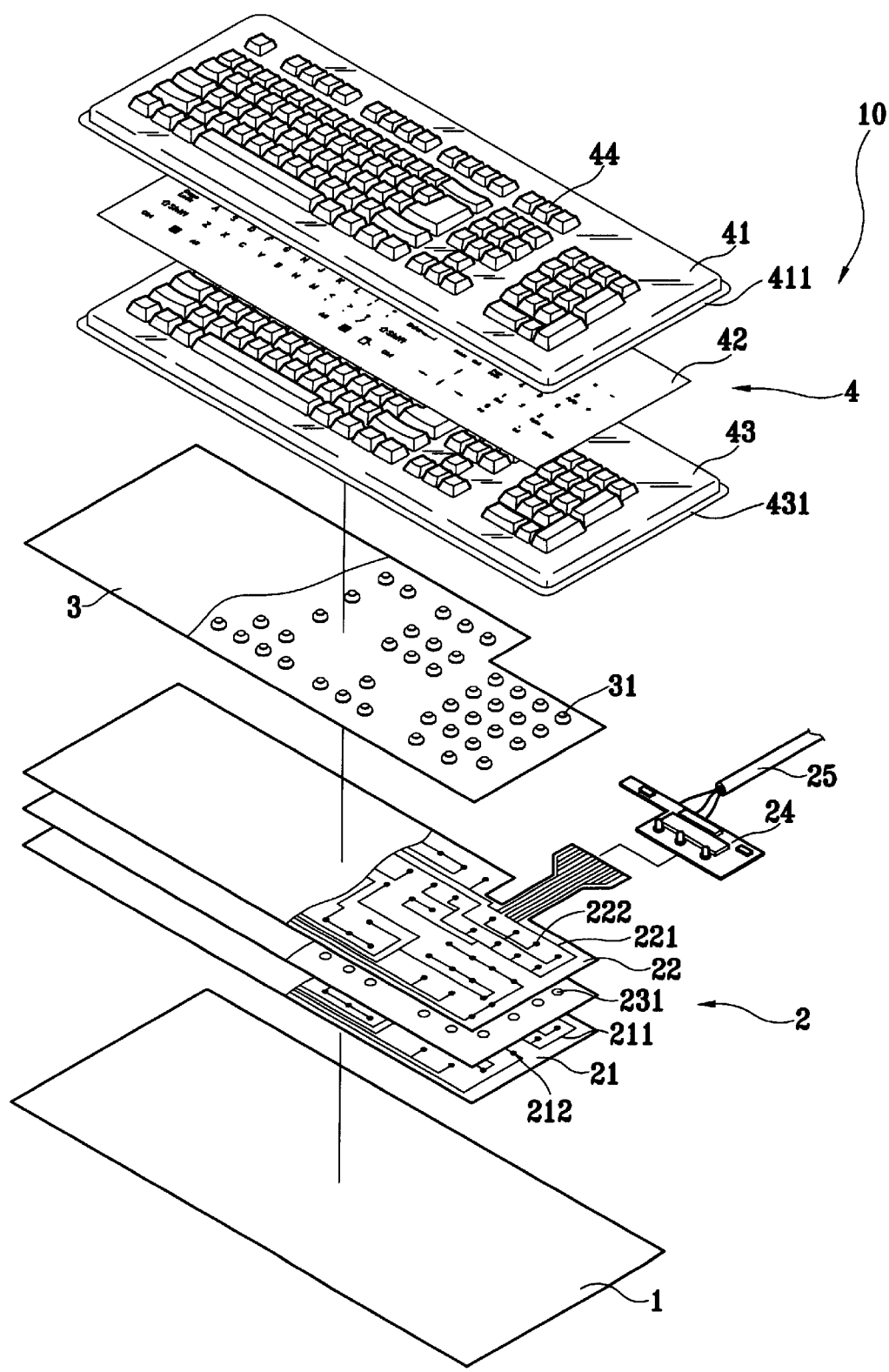
FIG. 1 is the exploded view of the inventive keyboard.

As shown in FIG. 1, the components of the inventive keyboard are made of flexible material such as thermoplastic polyurethane film (TPU). More particularly, the inventive keyboard 10 comprises sequentially a flexible substrate 1 of strip shape, a flexible circuit membrane 2, a flexible plate 3 and a flexible cover 4. The flexible circuit membrane 2 comprises a lower membrane 21 and an upper membrane 22 which have corresponding circuits 211, 221 and a plurality of contacts 212, 222. An insulating film 23 is arranged between two membrane 21 and 22 and has through hole 231 corresponding to the location of the contacts 212 and 222 such that the contacts 212 and 222 on the membranes 21 and 22 can be conducted. One end of the circuit membrane 2 is connected to another circuit board 24. The circuit board 24 is connected to CPU through a conductive line numeral 25.

The flexible plate 3 comprises a plurality of integrally formed resilient bodies 31 corresponding to the contacts 212 and 222 on the circuit membrane 2.

The flexible cover 4 comprises an upper film 41 and a lower film 43, which comprises an integrally formed keytop 44 such that the resilient body 31 can be placed within the keytop 44. The peripheral of the films 41 and 43 are provided with coupling parts 411 and 431 such that the films 41 and 43 can be joined with the substrate 1. Moreover, a smooth plate 42 is provided between two films 41 and 43, and the size of the plate 42 is smaller than those of the films 41 and 43. The surface of the plate 42 can be printed with English letters such A, B, C or numbers such as 1, 2, 3, . . . etc. The plate 42 can be arranged within the keytop 44 by pressing such that the printed matter on the plate 42 can be seen from the top of the upper film 41. Those skilled in the art should know the above printed matter can be printed on the surface or inner side of the keytop 44 on the upper film 41 or the lower film 43, or directly printed on the resilient body 31 such that the printed matter will not be dropped out.

With reference now to FIG. 2, this figure shows the flowchart of the present invention. The steps are as follow:

(A) First, a flexible circuit membrane 2 is provided on a flexible substrate 1;

(B) arranging a flexible plate 3 over the circuit membrane 2, a plurality of resilient bodies 31 are arranged on the plate 3 and corresponding to the contacts 212 and 222 on the membrane 2;

(C) arranging a flexible cover 4 over the flexible plate 3 such that the resilient bodies 31 are arranged within the keytop 44 of the flexible cover 4;

(D) joining the peripherals of above-mentioned components by radio heating, thus completes the assembling of the keyboard 10.

Figure 3:
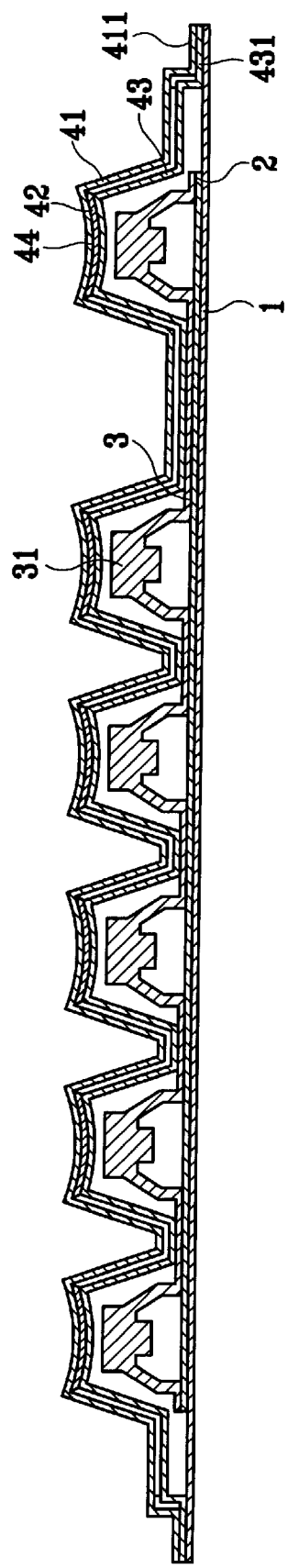
FIG. 3 shows the rolling of the inventive keyboard.
Figure 4:
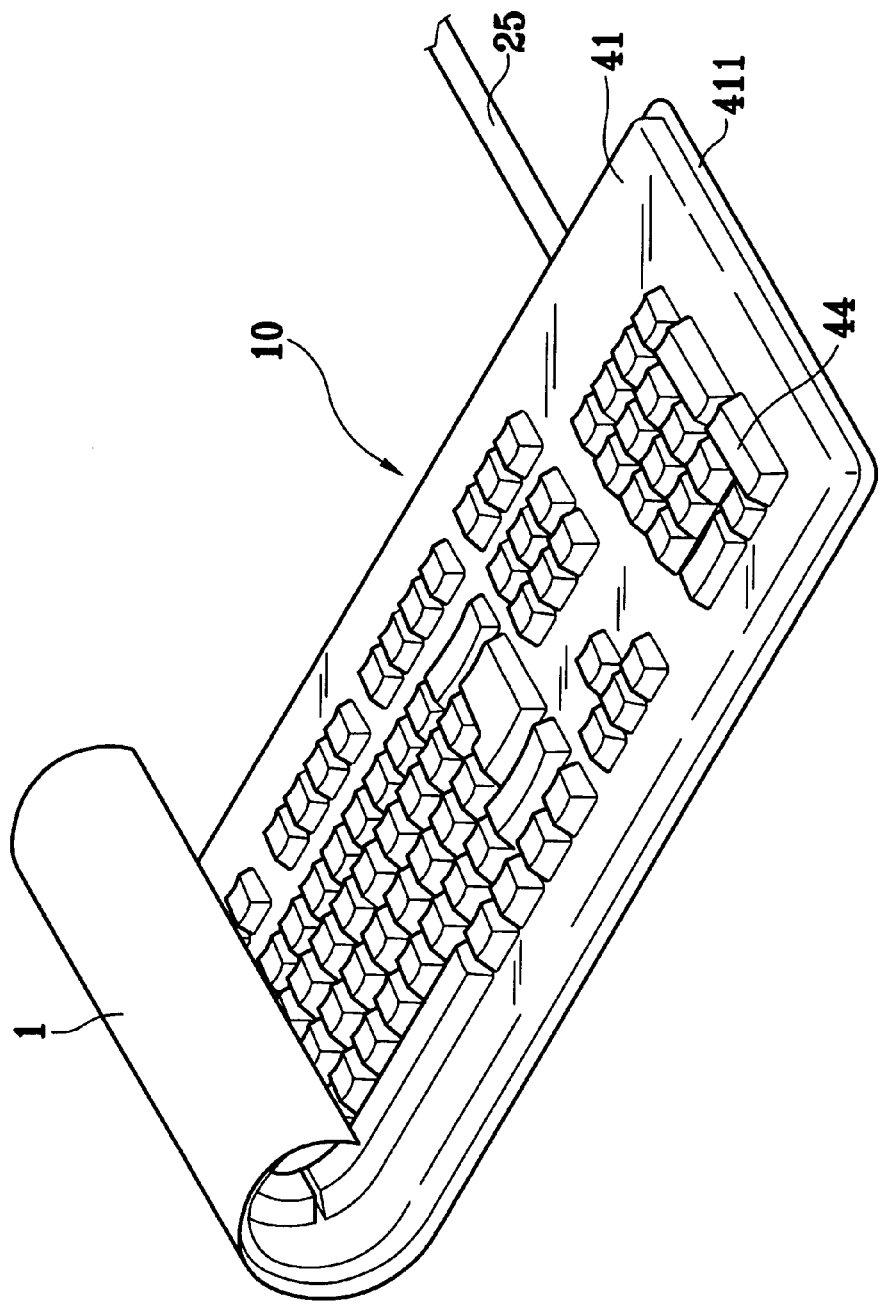
FIG. 4 is the exploded view of the conventional keyboard.
Figure 5:
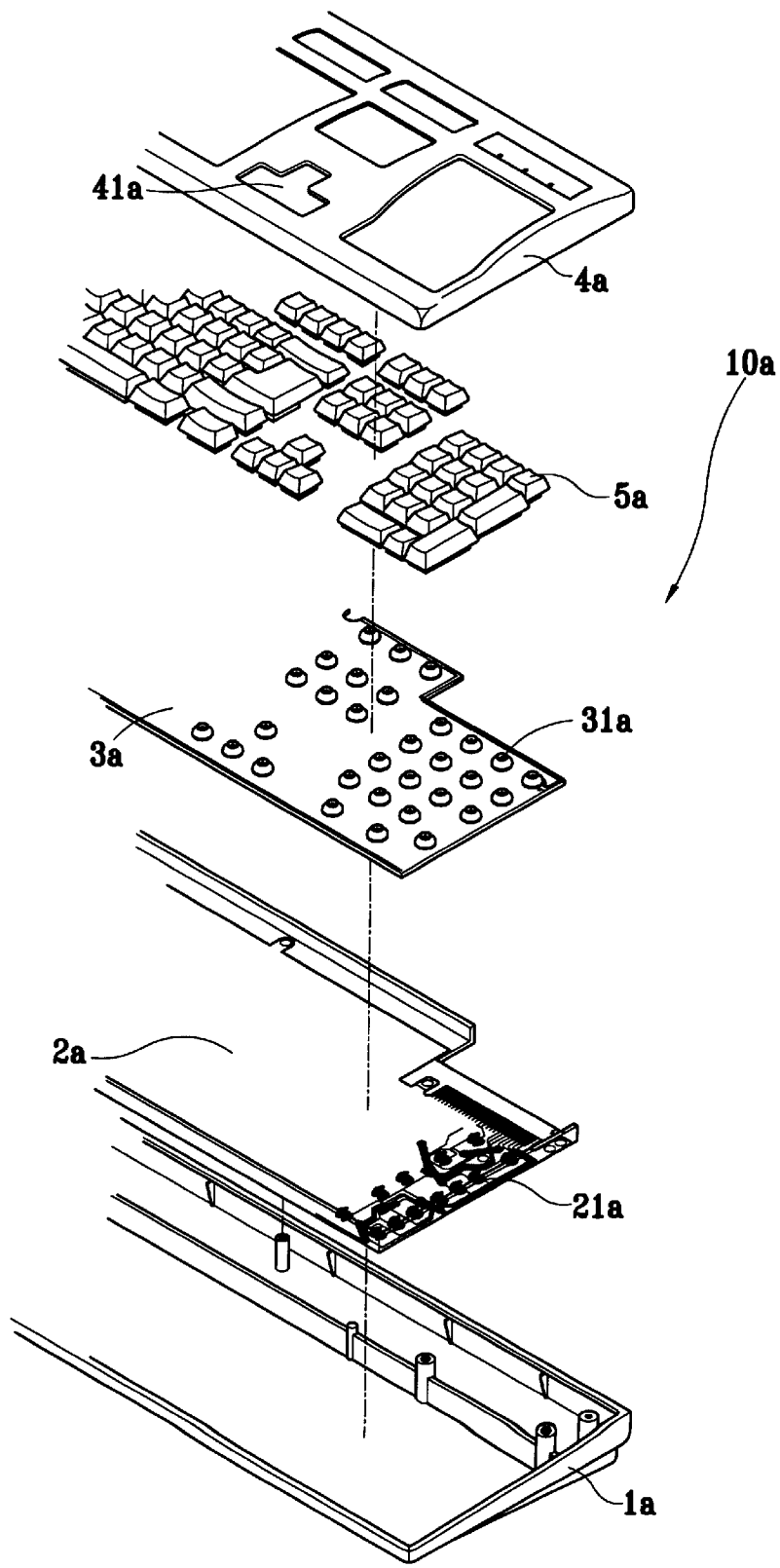

When using the inventive keyboard, the user pressed the keytop 44 on the flexible cover 4 to push the resilient body 31 within the keytop 44 down to touch the circuit membrane 2. The contact 222 of the upper membrane 22 is in contact with the contact 212 of the lower membrane 21. With reference now to FIG. 3 and 4 the inventive keyboard can be rolled due to the flexible property, therefore the inventive keyboard has the portable feature.

To sum up, in the present invention, the keytop 44 is integrally formed on the flexible cover 4 and joined by radio heating, thus simplifies the assembling of the keyboard 10. Moreover, all components of the inventive keyboard are flexible such that the keyboard can be rolled to be more portable. Furthermore, the peripheral of the keyboard 10 are joined by radio heating such that no aperture is formed between the flexible substrate 1 and the flexible cover 4. Therefore, the keyboard 10 has closed appearance to have water-proof property. Moreover, the inventive keyboard is more ergonomic.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method of assembling a flexible keyboard, comprising the steps of:
   a. providing a flexible membrane switch circuit on a flexible substrate member;
   b. providing a flexible plate member with a plurality of resilient bodies formed thereon;
   c. positioning said flexible plate member on said flexible membrane switch circuit, said plurality of resilient bodies being located in correspondence with respective switch positions of said flexible membrane switch circuit;
   d. providing a flexible cover having a plurality of keytop-shaped portions projecting upwardly from an upper surface thereof with a corresponding plurality or recesses formed in a lower surface of said flexible cover;
   e. overlaying said flexible cover on said flexible plate member with each of said plurality of resilient bodies being respectively received within said plurality of recesses; and,
   f. joining respective peripheral portions of said flexible membrane switch circuit, flexible plate member, and said flexible cover by radio heating to complete assembly of said flexible keyboard.

2. A method of assembling a flexible keyboard, comprising the steps of:
   a. providing a flexible membrane switch circuit on a flexible substrate member;
   b. providing a flexible plate member with a plurality of resilient bodies formed thereon;
   c. positioning said flexible plate member on said flexible membrane switch circuit, said plurality of resilient bodies being located in correspondence with respective switch positions of said flexible membrane switch circuit;
   d. providing a flexible cover having a plurality of keytop-shaped portions projecting from an upper surface thereof with a corresponding plurality or recesses formed in a lower surface of said flexible cover, said step of providing said flexible cover including the step of providing an upper film member overlaying a lower film member, said upper and lower film members each having respective peripheral portions;
   e. overlaying said flexible cover on said flexible plate member with each of said plurality of resilient bodies being respectively received within said plurality of recesses; and,
   f. joining respective peripheral portions of said flexible membrane switch circuit, flexible plate member, and said flexible cover by radio heating to complete assembly of said flexible keyboard.

3. The method as recited in claim 13 where said step of providing an upper film member overlaying a lower film member includes the steps of:
   a. providing a smooth plate member having indicia formed thereon;
   b. positioning said smooth plate member between said upper and lower film members; and,
   c. pressing said combined lower film member, smooth plate member and upper film member to respectively position said indicia coincident with said plurality of keytop-shaped portions.

4. A method of assembling a flexible keyboard, comprising the steps of:
   a. providing a flexible membrane switch circuit on a flexible substrate member, said step of providing said flexible membrane switch circuit including the steps of:
      (i) providing a lower membrane having first contacts formed thereon;
      (ii) providing an upper membrane overlaying said lower membrane and having second contacts formed thereon aligned with said first contacts; and,
      (iii) providing an insulating film disposed between said upper and lower membranes, said insulating film having a plurality of holes formed therethrough in alignment with said first and second contacts;
   b. providing a flexible plate member with a plurality of resilient bodies formed thereon;
   c. positioning said flexible plate member on said flexible membrane switch circuit, said plurality of resilient bodies being located in correspondence with respective switch positions of said flexible membrane switch circuit;
   d. providing a flexible cover having a plurality of keytop-shaped portions projecting from an upper surface thereof with a corresponding plurality or recesses formed in a lower surface of said flexible cover;
   e. overlaying said flexible cover on said flexible plate member with each of said plurality of resilient bodies being respectively received within said plurality of recesses; and,
   f. joining respective peripheral portions of said flexible membrane switch circuit, flexible plate member, and said flexible cover by radio heating to complete assembly of said flexible keyboard.

* * * * *